(12) United States Patent
Suzuki et al.

(10) Patent No.: US 8,243,310 B2
(45) Date of Patent: Aug. 14, 2012

(54) IMAGE FORMING DEVICE CONFIGURED TO RECEIVE AND PROCESS PRINT DATA FROM A CLIENT VIA NETWORK

(75) Inventors: Takanobu Suzuki, Aichi (JP); Yasuhiro Kudo, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 808 days.

(21) Appl. No.: 12/076,479

(22) Filed: Mar. 19, 2008

(65) Prior Publication Data

US 2008/0239385 A1   Oct. 2, 2008

(30) Foreign Application Priority Data

Mar. 30, 2007   (JP) ................................ 2007-094540

(51) Int. Cl.
*G06F 3/12* (2006.01)

(52) U.S. Cl. ...... 358/1.15; 358/1.1; 358/1.14; 358/1.13; 358/1.18

(58) Field of Classification Search ................. 358/1.15, 358/1.1
See application file for complete search history.

(56) References Cited

U.S. PATENT DOCUMENTS

| | | | |
|---|---|---|---|
| 6,334,161 B1 | 12/2001 | Suzuki et al. | |
| 6,425,019 B1 | 7/2002 | Tateyama et al. | |
| 6,603,737 B1 | 8/2003 | Fukunaga et al. | |
| 6,940,615 B1 * | 9/2005 | Shima | 358/1.15 |
| 2001/0042142 A1 * | 11/2001 | Fukunaga et al. | 710/11 |
| 2002/0030743 A1 * | 3/2002 | Inui | 348/195 |
| 2002/0062407 A1 | 5/2002 | Tateyama et al. | |
| 2002/0062453 A1 * | 5/2002 | Koga | 713/202 |
| 2002/0116500 A1 | 8/2002 | Arora et al. | |
| 2002/0154333 A1 | 10/2002 | Akashi | |
| 2003/0158979 A1 | 8/2003 | Tateyama et al. | |
| 2004/0130746 A1 * | 7/2004 | Wu | 358/1.15 |
| 2004/0186928 A1 | 9/2004 | Fukunaga et al. | |
| 2005/0073716 A1 | 4/2005 | Maki | |
| 2005/0138226 A1 | 6/2005 | Tateyama et al. | |

(Continued)

FOREIGN PATENT DOCUMENTS

CN   1190838 A   8/1998

(Continued)

OTHER PUBLICATIONS

Chinese Official Action dated Jan. 8, 2010 with English language translation.
Extended European Search Report dated Feb. 18, 2010.
Chinese Official Action dated Aug. 10, 2010 together with an English language translation.

(Continued)

*Primary Examiner* — Benny Tieu
*Assistant Examiner* — Martin Mushambo
(74) *Attorney, Agent, or Firm* — Scully, Scott, Murphy & Presser, P.C.

(57) ABSTRACT

An image forming device, which is configured to receive print data from a client via a network and process the print data, includes a print request receiving unit configured to receive a print request transmitted by the client with a protocol through a port of the image forming device, a protocol specifying unit configured to specify a kind of the protocol used in the transmission of the print request, a destination information creating unit configured to create destination information representing a destination to which the print data are to be sent, based on the protocol of the kind specified by the protocol specifying unit, and a destination information sending unit configured to send the destination information to the client with the protocol of the specified kind.

7 Claims, 8 Drawing Sheets

U.S. PATENT DOCUMENTS

| | | | |
|---|---|---|---|
| 2005/0246442 A1* | 11/2005 | Gutjahr | 709/227 |
| 2006/0256373 A1* | 11/2006 | Matsumoto et al. | 358/1.15 |
| 2006/0282655 A1 | 12/2006 | Yanagi | |
| 2007/0035766 A1 | 2/2007 | Yamamura | |

FOREIGN PATENT DOCUMENTS

| | | |
|---|---|---|
| JP | 2002-333958 | 11/2002 |
| JP | 2005-117320 | 4/2005 |
| JP | 2005-117321 | 4/2005 |
| JP | 2006-344125 | 12/2006 |
| JP | 2007-080227 | 3/2007 |

OTHER PUBLICATIONS

Chinese Official Action issued Nov. 23, 2010 together with an English language translation.

Japanese Official Action dated Jun. 7, 2011 together with an English language translation from JP 2007-094540.

Chinese Official Action dated Apr. 26, 2011 from CN 200810090735.2 together with an English language translation.

Chinese Official Action issued Feb. 13, 2012 together with an English language translation.

* cited by examiner

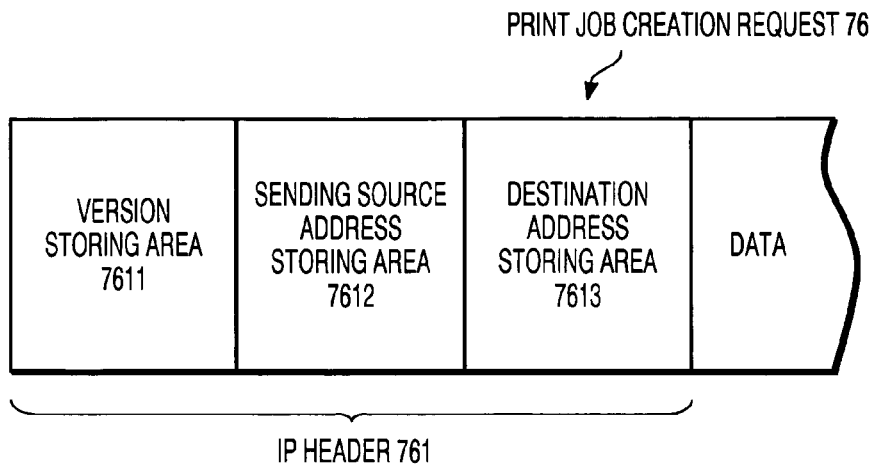
FIG.5A
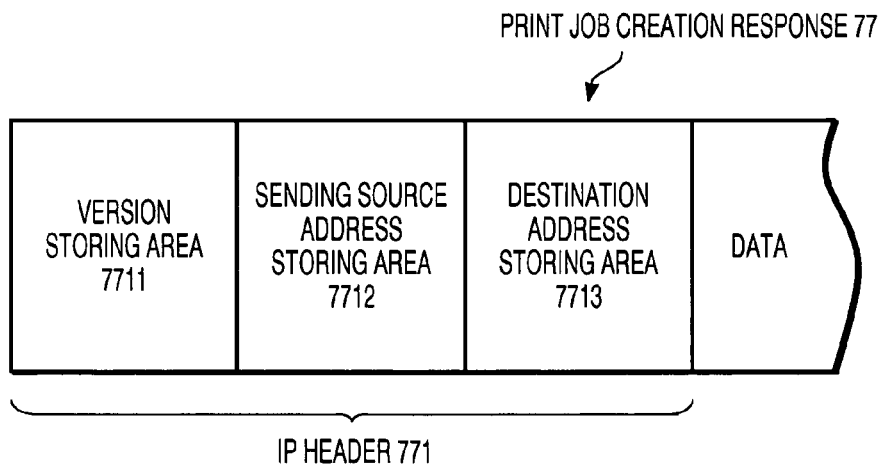
FIG.5B
PROVISION URL 772 INCLUDED IN PRINT JOB CREATION RESPONSE 77
IN CASE OF IPv4-HTTP
http://192.168.1.100:81
PROTOCOL   IP ADDRESS   PORT
 PORTION    PORTION    PORTION
   7721       7722      7723
IN CASE OF IPv4-HTTPS
http://192.168.1.100:444
IN CASE OF IPv6-HTTP
http://[FE80::280:77FF:FEBD:B05A]:81
IN CASE OF IPv6-HTTPS
http://[FE80::280:77FF:FEBD:B05A]:444
FIG.5C

IMAGE FORMING DEVICE CONFIGURED TO RECEIVE AND PROCESS PRINT DATA FROM A CLIENT VIA NETWORK

CROSS-REFERENCE TO RELATED APPLICATION

This application claims priority under 35 U.S.C. §119 from Japanese Patent Application No. 2007-094540 filed on Mar. 30, 2007. The entire subject matter of the application is incorporated herein by reference.

BACKGROUND

1. Technical Field

The following description relates to one or more techniques applicable to an image forming device, particularly to one or more techniques that allow the image forming device to perform communication based on a protocol to be used at a client side and lighten a burden of operation which a user is to bear at the client side.

2. Related Art

There has been proposed a system configured such that a user can search printing devices to be connected to a network with a mobile terminal device (terminal device) and select any device from the found printing devices (see Japanese Patent Provisional Publication No. 2006-344125, hereinafter, referred to as '125 Publication).

SUMMARY

However, according to a technique as disclosed in the '125 Publication, the print data to be sent to the printing device can be transmitted only with a predetermined protocol. Therefore, the print data might not unfortunately be sent with a user-desired protocol. For example, even though confidential data are required to be sent as print data, it is impossible to decide a protocol to be used for communication with the printing device based on device information transmitted by the printing device, since the device information is intended for selecting the printing device. Accordingly, the user has to operate the terminal device to separately select a protocol such as HTTPS that can protect security and establish communication with the printing device with the selected protocol. Namely, the above operation increases a burden of the user.

Aspects of the present invention are advantageous in that there can be provided one or more improved image forming devices, and methods and computer readable media applicable thereto that make it possible to lessen user operations required for performing communication with a protocol desired at a client side.

According to aspects of the present invention, there is provided an image forming device configured to receive print data from a client via a network and process the print data, which includes a print request receiving unit configured to receive a print request transmitted by the client with a protocol through a port of the image forming device, a protocol specifying unit configured to specify a kind of the protocol used in the transmission of the print request, a destination information creating unit configured to create destination information representing a destination to which the print data are to be sent, based on the protocol of the kind specified by the protocol specifying unit, and a destination information sending unit configured to send the destination information to the client with the protocol of the specified kind.

According to another aspect of the present invention, there is provided a method applicable to an image forming device configured to receive print data from a client via a network and process the print data, which includes steps of receiving a print request transmitted by the client with a protocol, specifying a kind of the protocol used in the transmission of the print request, creating destination information representing a destination to which the print data are to be sent, based on the protocol of the specified kind, and sending the destination information to the client with the protocol of the specified kind.

According to a further aspect of the present invention, there is provided a computer readable medium having computer readable instructions stored thereon, which cause a computer configured to receive print data from an external device via a network and process the print data to perform steps of receiving a print request transmitted by the external device with a protocol, specifying a kind of the protocol used in the transmission of the print request, creating destination information representing a destination to which the print data are to be sent, based on the protocol of the specified kind, and sending the destination information to the external device with the protocol of the specified kind.

In some aspects of the invention, as long as the client (external device) sends the print request with a desired protocol, the image forming device determines a destination of the print data. In addition, since the image forming device specifies the destination for the client with destination information, all the client has to do is to send the print data based on the destination information notified of by the image forming device. For example, when a user uses a predetermined protocol for the sake of security protection at the client side, communication on which a user's intention is reflected can be performed. Further, for instance, even though a protocol to be used at the client side is changed, communication that meets the change can be performed. Accordingly, by the aforementioned configurations according to some aspects of the invention, it is possible to lessen user operations required for performing communication with a protocol desired at the client side.

BRIEF DESCRIPTION OF THE ACCOMPANYING DRAWINGS

FIG. 1 schematically shows a connection relationship between an image forming device and a network system including the image forming device in an embodiment according to one or more aspects of the present invention.

FIG. 2 is a block diagram schematically showing of configurations of the image forming device and a client PC in the embodiment according to one or more aspects of the present invention.

FIG. 3 schematically shows communication to be performed between the client PC and image forming device in the embodiment according to one or more aspects of the present invention.

FIG. 4 schematically shows a process to be executed by a server program of the image forming device in the embodiment according to one or more aspects of the present invention.

FIG. 5A schematically shows a configuration of a print job creation request in the embodiment according to one or more aspects of the present invention.

FIG. 5B schematically shows a configuration of a print job creation response in the embodiment according to one or more aspects of the present invention.

FIG. 5C is a concrete example of provision URL included in the print job creation response in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
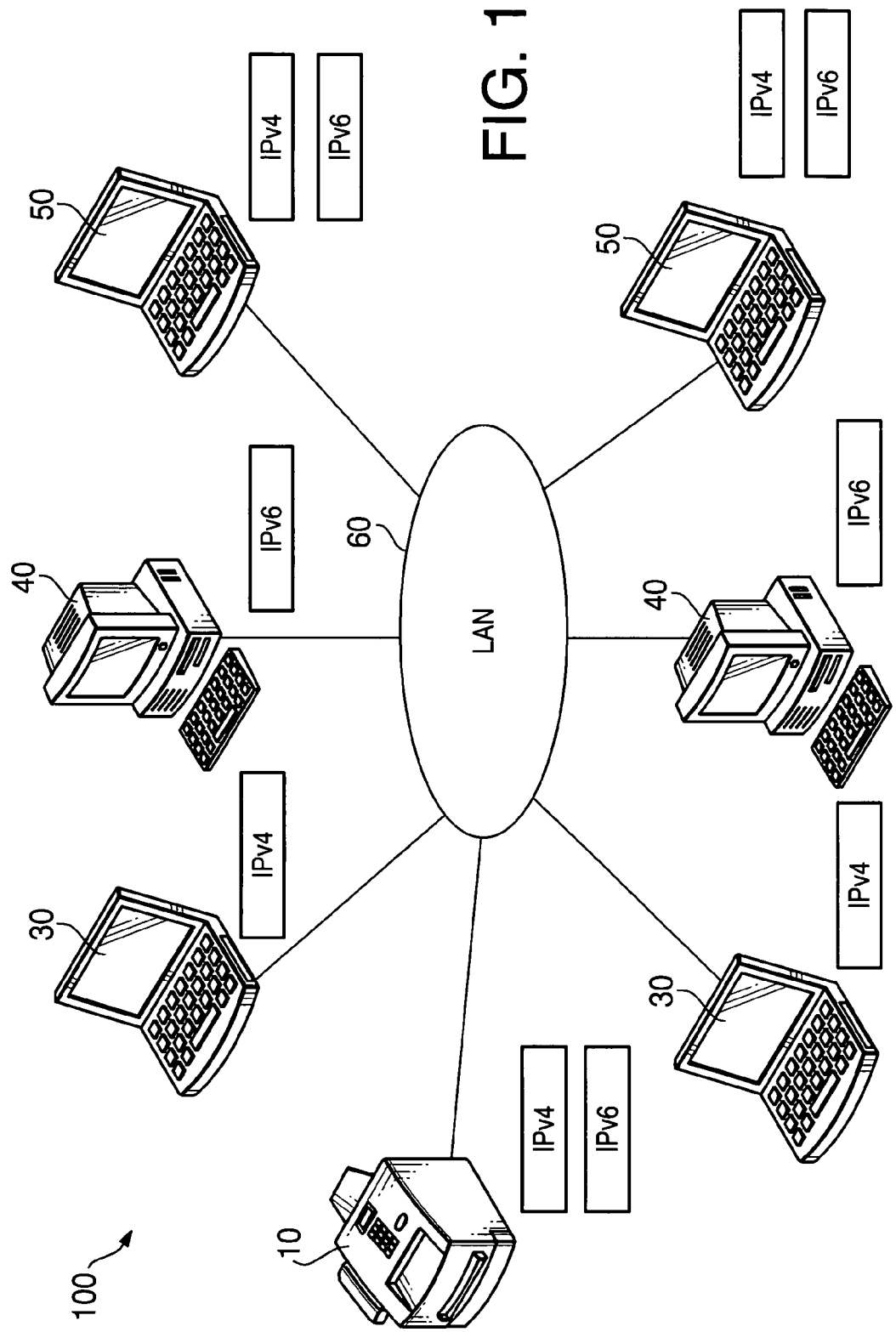

Hereinafter, an embodiment according to aspects of the invention will be described with reference to the accompanying drawings. FIG. 1 schematically shows a connection relationship between an image forming device 10 in an embodiment according to aspects of the invention and a network system 100 including the image forming device 10. The image forming device 10 is connected with a plurality of personal computers (hereinafter, referred to as client PCs) 30, 40, and 50 via a LAN 60. The image forming device 10 is configured to receive print data from the client PCs 30, 40, and 50, and to process the received print data so as to form an image on a recording paper.

Each of the client PCs 30, 40, and 50 is configured to perform communication with the image forming device 10 and send the print data to the image forming device 10. When data are transmitted by each of the client PCs 30, 40, and 50, a packet is formed with a header including an IP address of a sending source device and an IP address of a destination device being added to the data, and the data are sent on a packet basis. There have been known as a protocol for forming the packet and selecting a route of the packet transmission, Internet Protocol version 4 (hereinafter, referred to as IPv4) and Internet Protocol version 6 (hereinafter, referred to as IPv6). IPv4 is a protocol that has conventionally been widespread. In IPv4, the IP address is represented as 32-bit data, and therefore there have been concerns that a shortage of IP addresses may be caused. In view of the concerns, IPv6 with a larger number of digits for an address space has been developed as a protocol that can replace IPv4, and has been coming into wide use. IPv6, in which the IP address is represented as 128-bit data, can support a larger number of IP addresses.

In the following description, a client PC that conforms only to IPv4 will be referred to as the client PC 30. Meanwhile, a client PC that conforms only to IPv6 will be referred to as the client PC 40. In addition, a client PC that conforms to both IPv4 and IPv6 will be referred to as the client 50. It is noted that the image forming device 10 according to aspects of the invention conforms to both of the protocols.

A packet format and IP address space are different between IPv4 and IPv6. Therefore, direct communication cannot be performed between a device that conforms only to IPv4 and a device that conforms only to IPv6. The network system 100 includes the client PC 30 that conforms only to IPv4, the client PC 40 that conforms only to IPv6, and the client PC 50 that can conform to both IPv4 and IPv6. Accordingly, in the network system 100, the image forming device 10 establishes communication based on judgment whether an internet protocol (hereinafter, referred to as IP) used by a destination client PC is IPv4 or IPv6. Details about this operation will be described below.

Further, each of the image forming device 10 connected with the network system 100 and the client PCs 30, 40, and 50 conforms to UPnP (Universal Plug and Play). UPnP is an architecture for pervasive peer-to-peer network connectivity of devices such as computers and peripheral devices connected with a network. The client PCs 30, 40, and 50 and the image forming device 10 as devices that conform to UPnP mutually recognize each other and function through communication of predetermined data. Details about this operation will be described below with reference to FIG. 3.

Figure 2:
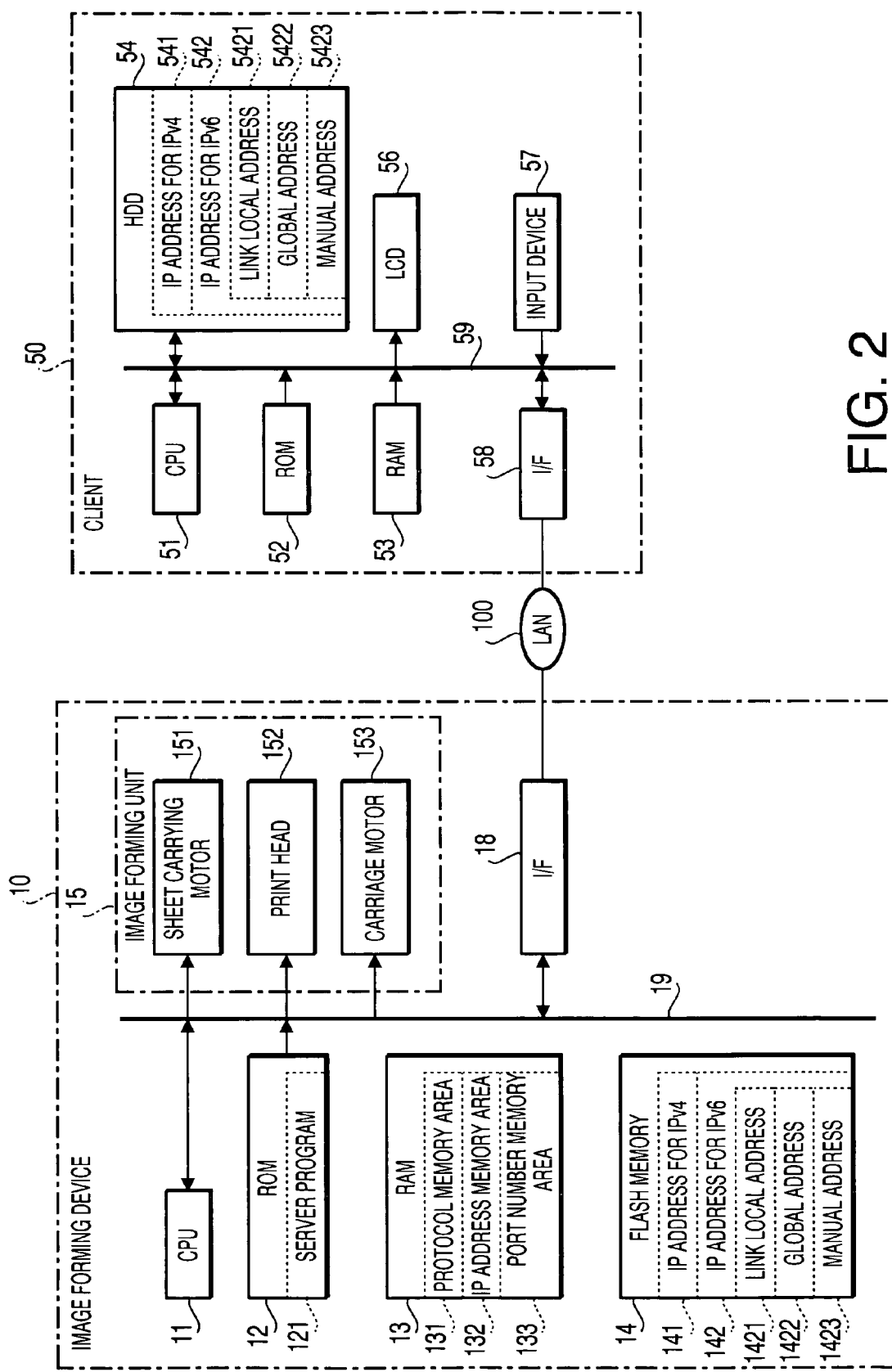

FIG. 2 is a block diagram schematically showing a connection between the image forming device 10 and client PC 50 shown via the LAN. As described with reference to FIG. 1, the LAN 60 can be connected with a plurality of client PCs 50, and further connected with the client PCs 30 and client PCs 40. However, for the sake of simplicity in diagrammatic representation and explanation, in FIG. 2, only a single client PC 50 is shown and described among the client PCs connected with the LAN 60.

As shown in FIG. 2, the image forming device 10 includes a CPU 11, ROM 12, RAM 13, flash memory 14, image forming unit 15, and network interface 18 (I/F 18), which are interconnected via a bus line 19.

Figure 8:
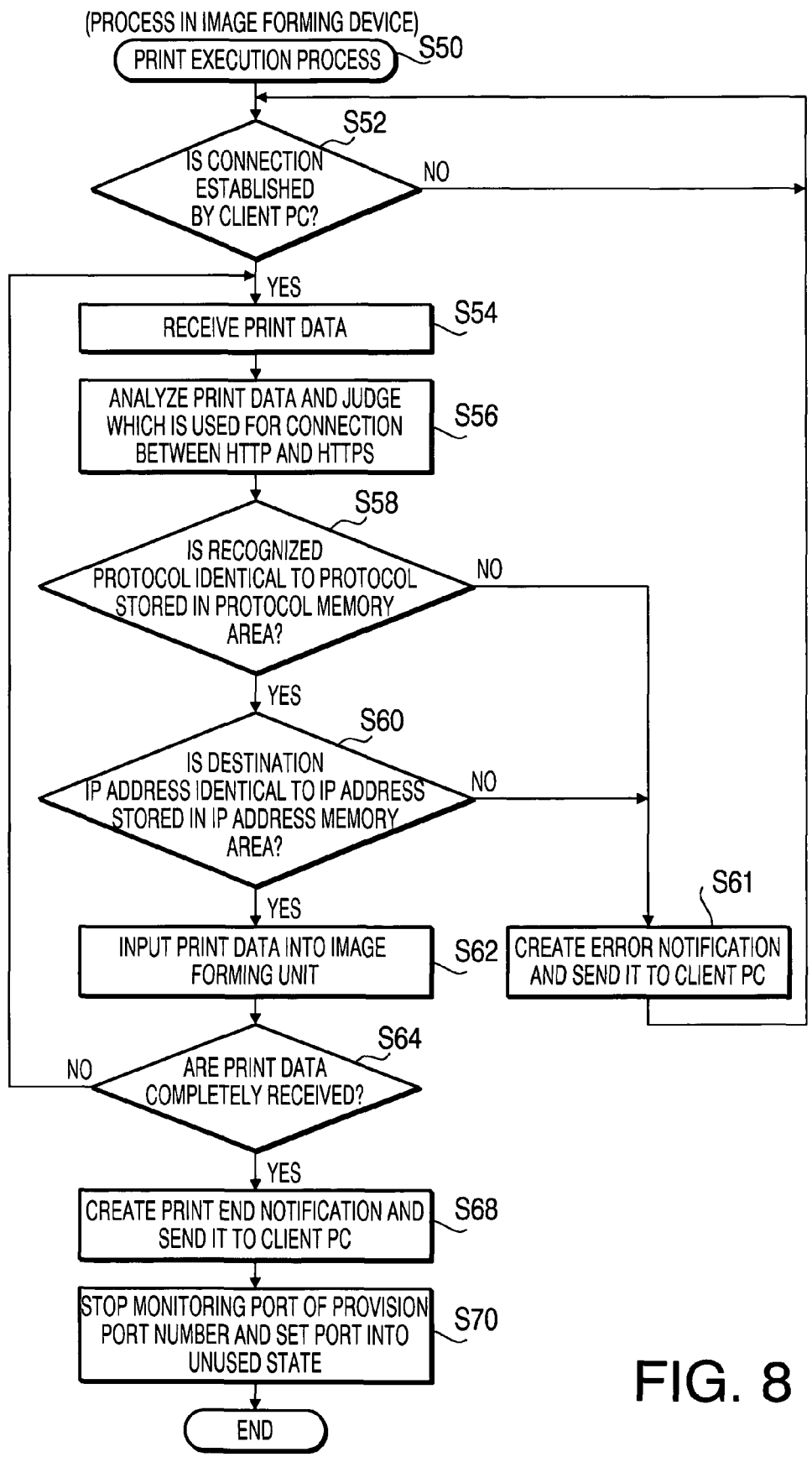
FIG. 8 is a flowchart showing a print execution process in the embodiment according to one or more aspects of the present invention.

The CPU 11 is a central processing unit that overall controls the image forming device 10, and executes various programs such as a program executing a process as shown in a flowchart of FIG. 8.

The ROM 12 is a non-rewritable memory that stores therein various control programs to be executed by the CPU 11 and data required when the CPU 11 executes the control programs, and stores a server program 121 therein. The server program 121 is a program for performing a process to be mentioned below with reference to FIGS. 6 to 8, and provides a service in response to a request from the client PCs 30, 40, and 50. The server program 121 can treat respective communications based on HTTP (Hypertext Transfer Protocol) and HTTPS (Hypertext Transfer Protocol Security) as protocols in an application layer.

The RAM 13 is a memory that temporarily stores therein data and programs required for various processes to be executed by the CPU 11. The RAM 13 includes a protocol memory area 131, IP address memory area 132, and port number memory area 133. The protocol memory area 131 is an area for storing therein information regarding which is used between HTTP and HTTPS as a protocol in the application layer for communication of a request for print job creation (hereinafter, referred to as a print job creation request) as an example of a print request, when receiving the print job creation request from the client PC 50.

The IP address memory area 132 is an area that stores therein an IP address of the client PC 50 as a sending source of the print job creation request when receiving the print job creation request from the client PC 50.

The port number memory area 133 is an area that stores therein a port number of a port through which the print job creation request is received from the client PC 50.

The flash memory 14 is a non-volatile rewritable memory that stores therein an IP address 141 for IPv4 and IP address 142 for IPv6. When performing communication with the image forming device 10, the client PC 50 performs the communication with designating the IP address 141 for IPv4 in the case of using IPv4. Meanwhile, the client PC 50 performs the communication with designating the IP address 142 for IPv6 in the case of using IPv6.

There are configurable as the IP address 142 for IPv6, link local address 1421, global address 1422, and manual address 1423. The link local address 1421 is an address that is valid only in the same LAN not to extend beyond a router, that is, only in the network system 100. The global address 1422 is an address defined as a single address in the world, and used when performing communication via the Internet. The manual address 1423 is an address manually configurable by an administrator of the network system 100.

The image forming unit 15 is configured to form an image based on print data received from the client PC 50. The image forming unit 15 mainly includes sheet carrying motor 151 for carrying a recording paper to a predetermined print position, a print head 152 that ejects an ink drop onto the recording paper carried to the print position to form an image, and a carriage motor 153 for driving the print head to move back and forth in a direction perpendicular to a direction in which the recording paper is carried by the sheet carrying motor 151.

The I/F 18 is configured to link the image forming device 10 with the LAN 60. Data communication is performed between the image forming device 10 and the client PC 50 via the I/F 18.

The client PC 50 includes a CPU 51, ROM 52, RAM 53, hard disk drive 54 (hereinafter, referred to as HDD 54), liquid crystal display device 56 (hereinafter, referred to as LCD 56), input device 57, and network interface 58 (I/F 58) for connecting the client PC 50 and the image forming device 10 via the LAN 60, which are interconnected via a bus line 59.

The CPU 51 is a central processing unit that overall controls the client PC 50 and executes various programs. The ROM 52 is a non-rewritable memory that stores therein various control programs to be executed by the CPU 51 and data required when the CPU 51 executes the control programs. The RAM 53 is a memory that temporarily stores therein data and programs required for various processes to be executed by the CPU 51.

The HDD 54 is a non-volatile rewritable storage device that stores therein various programs, an IP address 541 for IPv4, and an IP address 542 for IPv6. In the same manner as the image forming device 10, there are configurable as the IP address 542 for IPv6, link local address 5421 that is valid only in the network system 100, global address 5422 used when performing communication via the Internet, and manual address 5423 manually configurable by the administrator of the network system 100. In the client PC 50, there has previously been configured a setting of which is performed between the communication based on IPv4 and communication based on IPv6, and communication is performed in accordance with the previously configured setting.

The LCD 56 is provided for visually recognizing various processes executed and inputted data in the client PC 50. The input device 57 is configured with a keyboard and/or mouse, and data or a command is inputted into the client PC 10 through the input device 57.

In the client PC 50 configured as above, when a print instructing command is inputted through the input device 57, the print job creation request is transmitted from the I/F 58 to the image forming device 10. Then, the communication between the client PC 50 and the image forming device 10 is started, and the print data are sent from the client PC 50 to the image forming device 10. It is noted that, during a time period, after a print job creation request is sent to the image forming device 10 by a program in execution, until the print data are processed in the image forming device 10 in response to the print job creation request and a print termination notification is issued to the program, the program, among the various programs stored in the HDD 14, is referred to as a client program.

Figure 3:
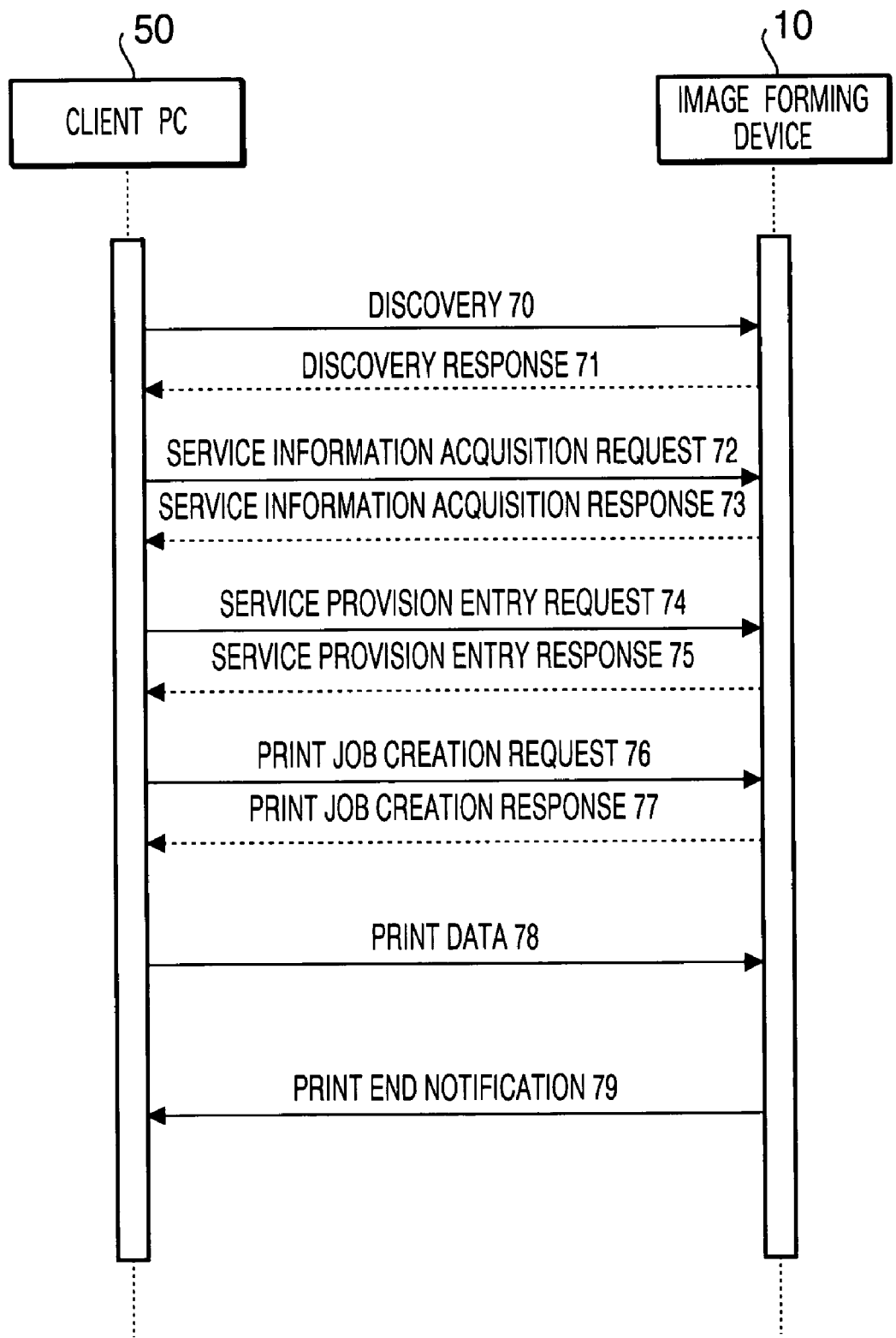

Referring to FIG. 3, data to be sent and received between the client PC 50 and the image forming device 10 will be described. FIG. 3 schematically shows a procedure of the communication to be performed between the client PC 50 and the image forming device 10.

Firstly, the client PC 50 sends a discovery 70 for searching devices on the network system 100 through multicast communication. On the other hand, the image forming device 10 that has received the discovery 70 sends a discovery response 71 to the client PC 50 that is a sending source of the discovery 70. A URL of the image forming device 10 is provided to the client PC 50 by the discovery response 71. The communication after the transmission of the discovery 70 until the acquisition of the discovery response 71 is performed when the implementation of the discovery is instructed by the client PC 50, or when the client PC 50 is powered ON.

Subsequently, the client PC 50 sends a request 72 for service information acquisition (hereinafter, referred to as a service information acquisition request 72) to the image forming device 10 in accordance with the acquired URL of the image forming device 10. The image forming device 10, which has received the service information acquisition request 72, sends a service information acquisition response 73 to the client PC 50. In response to receiving the service information acquisition response 73, the client PC 10 regards the image forming device 10 as a device that can conform to both HTTP and HTTPS as a protocol in the application layer and to both IPv4 and IPv6 as an IP.

Next, the client PC 50 transmits a request 74 for service provision entry (hereinafter, referred to as a service provision entry request 74) to the image forming device 10. The image forming device 10, which has received the service provision entry request 74, registers a URL of the client PC 50 as a sending source of the service provision entry request 74. Then, for example, when occurrence of a predetermined event such as ink exhaustion, open/close of a cover, and print termination is detected, the registered client PC 50 is notified of the occurrence of the predetermined event. It is noted that, when the URL of the client PC 50 is registered, the image forming device 10 informs the client PC 50 of it with a service provision entry response 75.

As described above, the communication until the acquisition of the service provision entry response 75 after the transmission of the service information acquisition request 72 is performed when the implementation of the service entry is instructed by the client PC 50, or when the client PC 50 is powered ON.

Next, there will be explained a case where a print instructing command is inputted through the input device 57 in the client PC 50. When the print instructing command is inputted in the client PC 50, a request 76 for print job creation (hereinafter, referred to as a print job creation request 76) is transmitted from the client PC 50 to the image forming device 10. When the print job creation request 76 is transmitted, it is decided in the client PC 50 which is used for sending the request 76 between HTTP and HTTPS as a protocol in the application layer. When HTTP is used, there is an advantage that a processing speed is fast. Meanwhile, when HTTPS is used, there is an advantage that higher-security communication can be performed. Which is used between HTTP and HTTPS may be decided in accordance with a predetermined setting in the client PC 50, or an input operation by the user.

When the print job creation request 76 is transmitted with HTTP, the client PC 50 performs the communication designating a port No. 80. Meanwhile, when the print job creation request 76 is transmitted with HTTPS, the client PC 50 performs the communication designating a port No. 443. On the other hand, the image forming device 10 keeps waiting for connection to be established by the client PC 50 through the ports No. 80 and No. 443. When connection is established by the client PC 50 through any of the ports, the image forming device 10 sends a print job creation response 77. The print job creation response 77, which will be described in detail blow, is data that include a provision URL 772 (see FIG. 5C) representing a destination for sending the print data from the client PC 50 to the image forming device 10.

Subsequently, the client PC 50 transmits print data 78 to the image forming device 10 in accordance with the provision URL 772 included in the received print job creation response 77. The image forming device 10, which has received the print data 78, forms an image on a recording paper by processing the print data.

When the print data processing is completed, the image forming device 10 sends a print end notification 79 to the client PC 50. Thereby, the client PC 50 is notified that the printing operation is completed.

Figure 4:
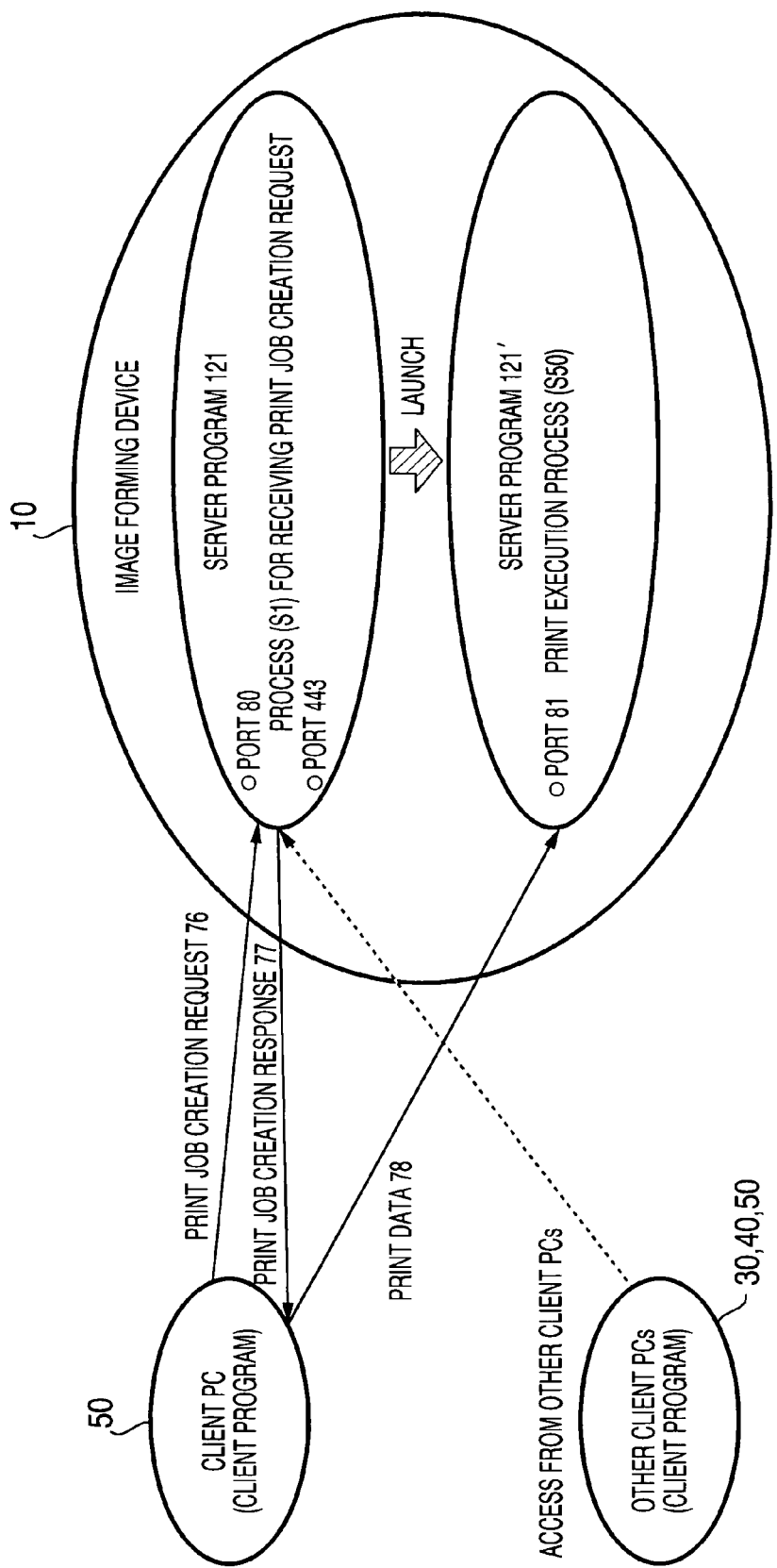

Referring to FIG. 4, overview of a process to be executed in the image forming device 10 will be described. FIG. 4 schematically shows a process to be executed by a server program 121 of the image forming device 10. As shown in FIG. 4, a process (S1) for receiving the print job creation request, to be executed by the server program 121, monitors the port No. 80 and the port No. 443 and waits for the connection to be established by the client PC 50. Then, when receiving the print job creation request 76 from a client program to be executed in the client PC 50, the image forming device 10 creates and sends the print job creation response 77.

Further, in the process (S1) for receiving the print job creation request, when receiving the print job creation request 76, as shown in FIG. 4, the image forming device 10 further runs a server program 121'. Namely, in the image forming device 10, the server program 121 and the server program 121' are in execution. The server program 121' implements a print execution process (S50) that takes on receiving and processing the print data. In other words, the print execution process (S50) corresponds to a subsidiary process of the process (S1) for receiving the print job creation request. The process (S1) for receiving print job creation request commits, to the print execution process (S50) as a subsidiary process thereof, the transmission of the print job creation response 77 and subsequent processes. In the print execution process (S50), the image forming device 10 keeps waiting for connection through a port different from a port used in the process (S1) for receiving the print job creation request, and when the connection is established by the client PC 50, the image forming device 10 receives the print data 78 and implements the print data 78 processing. Each time receiving the print job creation request 76, the print execution process (S50) is started. Then, each started print execution process (S50) receives print data through an individual port and processes the print data.

Thus, the server program 121 is prevented from being occupied by a single client PC 50. Further, receiving and processing of the print data 78 from a plurality of client PCs 30, 40, and 50 can artificially be performed in parallel.

Referring to FIG. 5, the print job creation request 76 and print job creation response 77 will be described. FIG. 5A schematically shows a configuration of the print job creation request 76. FIG. 5B schematically shows a configuration of the print job creation response 77. Data communication between the client PC 50 and the image forming device 10 is performed on a packet-by-packet basis. In addition, IP headers 761 and 771 are added to a top of each packet of the print job creation request 76 and print job creation response 77.

As shown in FIG. 5A, in the IP header provided at the top of the packet of the print job creation request 76, there are provided a version storing area 7611, sending source address storing area 7612, and destination address storing area 7613.

In the version storing area 7611, there is stored a version of an IP (Internet Protocol) used by the sending source device of the print job creation request 76, i.e., the client PC 50. Specifically, "4" or "6" is stored in the version storing area 7611.

in the sending source address storing area 7612, there is stored the address of the sending source device, i.e., the client PC 50. As described above, the client PC 50 has the IP address 541 for IPv4 and IP address 542 for IPv6. When "4" is stored in the aforementioned version storing area 7611, the IP address 541 for IPv4 is stored in the sending source address storing area 7612. When "6" is stored in the version storing area 7611, the IP address 542 for IPv6 is stored in the sending source address storing area 7612.

The destination address storing area 7613 is an area for storing therein a destination address of the print job creation request 76, namely, the IP address of the image forming device 10. When "4" is stored in the above version storing area 7611, the address 141 for IPv4 of the image forming device 10 is stored into the destination address storing area 7613. Meanwhile, when "6" is stored in the version storing area 7611, the address 142 for IPv6 of the image forming device 10 is stored into the destination address storing area 7613.

The packet configured as above is created, and transmitted to the image forming device 10. Thereby, the transmission of the print job creation request 76 from the client PC 50 to the image forming device 10 is performed with an IP of a version previously determined in the client PC 50 between IPv4 and IPv6.

Referring to FIG. 5B, the print job creation response 77 will be described. As shown in FIG. 5B, there are provided in the IP header 771, a version storing area 7711, sending source address storing area 7712, and destination address storing area 7713.

In the version storing area 7711, there is stored the same version of IP as the IP used by the client PC 50 as a sending source device of the print job creation request 76. Namely, the image forming device 10 performs communication based on the same IP as that used in the transmission of the print job creation request 76 by the client PC 50.

In the version storing area 7712, there is stored the IP address of the sending source device, that is, the IP address of the image forming device 10. As described above, the image forming device 10 has the IP address 141 for IPv4 and the IP address 142 for IPv6 as an IP address. When "4" is stored in the above version storing area 7711, the address 141 for IPv4 of the image forming device 10 is stored into the sending source address storing area 7712. Meanwhile, when "6" is stored in the version storing area 7711, the address 142 for IPv6 of the image forming device 10 is stored into the sending source address storing area 7712.

The destination address storing area 7712 is an area for storing therein an address of the client PC 50.

By sending the packet configured as above to the client PC 50, the transmission of the print job creation response 77 from the image forming device 10 to the client PC 50 is performed with an IP previously determined in the client PC 50 between IPv4 and IPv6. Accordingly, even though the client PC 50 conforms only to either IPv4 or IPv6, the communication can certainly be performed. Furthermore, when the user intentionally selects either IPv4 or IPv6 for the client PC 50, the communication can be performed with a version of IP in accordance with the user's intention.

With reference to FIG. 5C, there will be described the provision URL 772 as an example of destination information included in the print job creation response 77. FIG. 5C is a concrete example of the provision URL 772 included in the print job creation response 77. As shown in FIG. 5C, the provision URL 772 includes a protocol portion 7721, IP address portion 7722, and port portion 7723.

In the protocol portion 7721, there is set an identifier "http://" or https:// that represents a protocol in the application layer used in the communication of the print job creation response 77. Here, the protocol in the application layer used in the communication of the print job creation response 77 is the same protocol as the protocol used in the communication of the print job creation request 76. Therefore, when HTTP is used in the communication of the print job creation request 76, http:// is set in the protocol portion 7721. Meanwhile, when HTTPS is used in the communication of the print job creation request 76, https:// is set in the protocol portion 7721.

In the IP address portion 7722, the IP address of the image forming device 10 is set. When IPv4 is used in the communication of the print job creation request 76, there is described in the IP address portion 7722, the IP address 141 for IPv4 of the image forming device 10. When IPv6 is used in the communication of the print job creation request 76, there is described in the IP address portion 7722, the IP address 142 for IPv6 of the image forming device 10.

There is set in the port portion 7723, a port number with which the print execution process (S50: see FIG. 4) keeps waiting for the connection. The client PC 50, which has received the print job creation response 77 including such a provision URL 772, the connection to the port for which the print execution process (S50) waits is established with the IP address described in the IP address portion 7722 and the port number described in the port portion 7723, and transmission of the print data 78 is performed. Which is to be used in the transmission of the print data 78 between HTTP and HTTPS can be selected by the user in the client PC 50. When the user does not give any selecting operation, which is to be used in the transmission of the print data 78 between HTTP and HTTPS is decided in accordance with a setting previously configured in the client PC 50.

Figure 6:
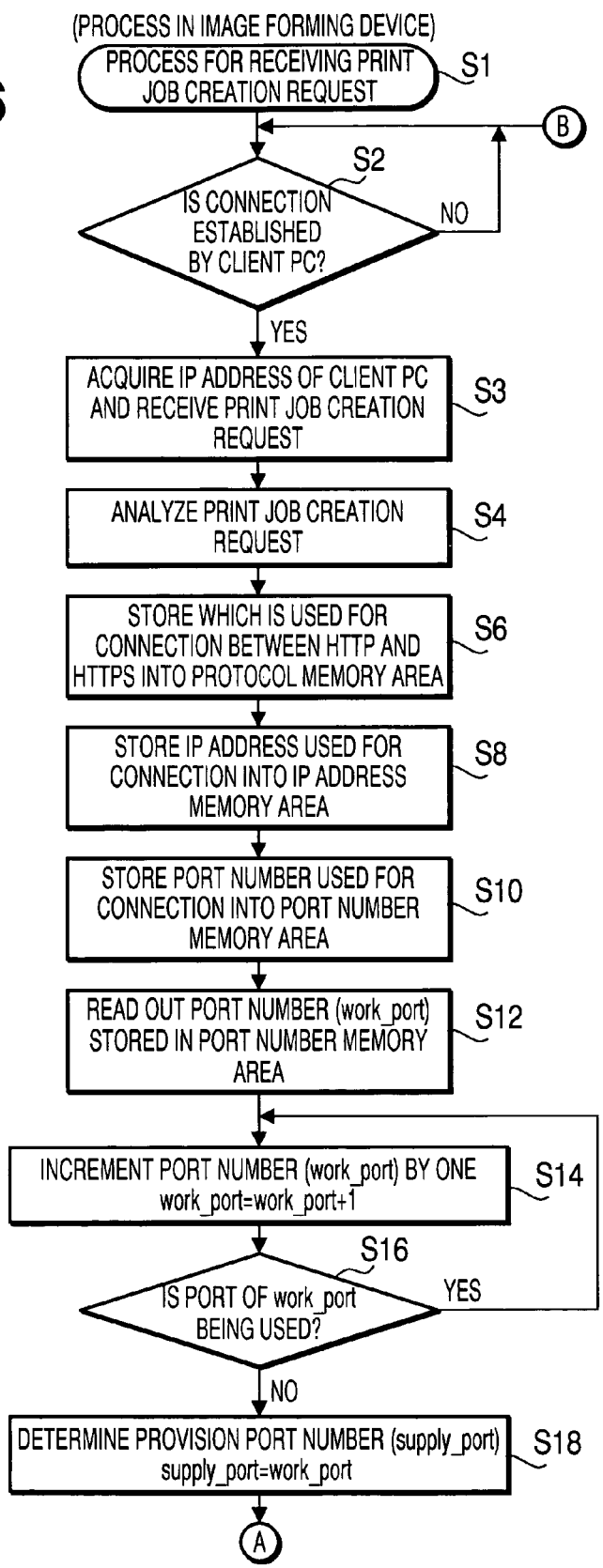
FIG. 6 is a flowchart showing a process for receiving the print job creation request in the embodiment according to one or more aspects of the present invention.
Figure 7:
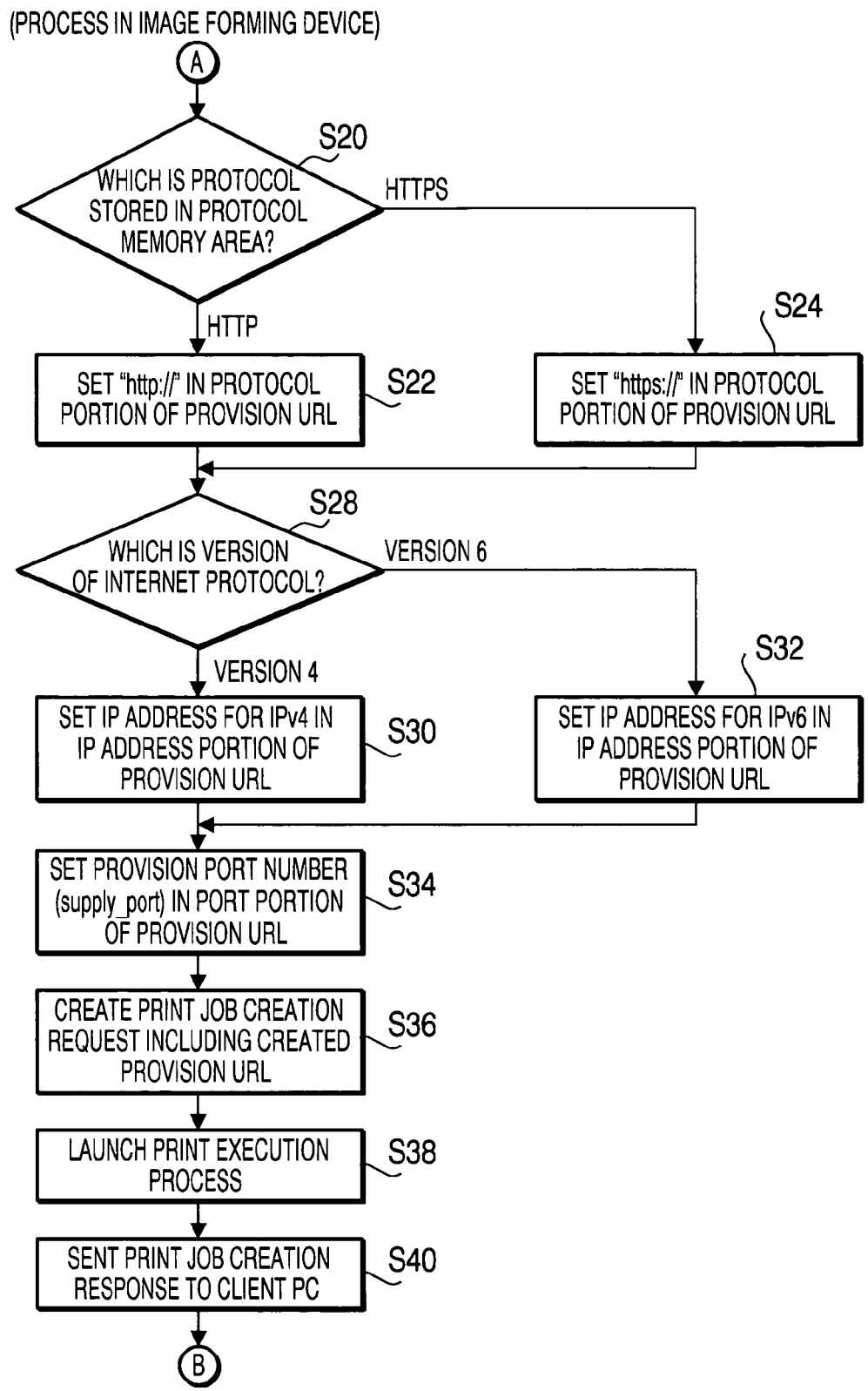
FIG. 7 is a flowchart showing a subsequent process of the process shown in FIG. 6 for receiving the print job creation request in the embodiment according to one or more aspects of the present invention.

Referring to FIGS. 6 to 8, processes to be executed by the image forming device 10 will be described. Each of the processes shown in FIGS. 6 to 8 are executed in accordance with the server program 121.

FIG. 6 is a flowchart showing the process (S1) for receiving the print job creation request to be executed in the image forming device 10. FIG. 7 is a flowchart of a subsequent process of the process shown in FIG. 6.

In the process (S1) for receiving the print job creation request, firstly, the ports No. 80 and No. 443 are monitored to judge whether the connection to the image forming device 10 is established by the client PC 30, 40 or 50 (S2). While the connection to the image forming device 10 is not established by any of the client PCs 30, 40, and 50 (S2: No), the present process is in a stand-by state. Meanwhile, when the connection to the image forming device 10 is established by the client PC 30, 40, or 50 (S2: Yes), the IP address of the client PC 30, 40, or 50 by which the connection to the image forming device 10 has been established is obtained. Then, the print job creation request 76 transmitted by the client PC is received (S3). The following explanation will be given based on an assumption that the print job creation request 76 transmitted by the client PC 50 is received.

Next, the received print job creation request 76 is analyzed (S4). Thereafter, it is judged by the analysis of the print job creation request 76 whether the protocol in the application layer used in the transmission of the print job creation request 76 is HTTP or HTTPS, and the judgment result is stored into the protocol memory area 131 (see FIG. 2) (S6). It is noted that, when the analysis result gives a judgment that the protocol is not HTTP or HTTPS, an error notification may be sent to the client PC 50, and the present process may be terminated.

Subsequently, the IP address of the client PC 50, by which the connection to the image forming device 10 has been established, is stored into the IP address memory area 132 (see FIG. 2) (S8). Then, the port number with which the connection has been established is stored into the port number storing area 133 (S10). Namely, "80" or "443" is stored into the area 133.

Next, the port number stored in the port number storing area 133 is read out (S12). In the flowchart shown in FIG. 6, the port number is represented by a parameter "work_port." Then, the read-out port number is incremented by one (S14). For example, when the connection has been established with the port number "80," the pot number is incremented by one, and "81" is obtained as the port number. Thereafter, it is judged whether the port with the number incremented by one is currently being used by any other processes (S16). When it is judged that the port with the number incremented by one is currently being used by any other processes (S16: Yes), the present process goes back to S14, in which the port number is further incremented by one (S14).

When, repeating the process in this way, a port number judged not to be currently used by any other processes is found (S16: No), the found port number is determined as a provision port number (S18). It is noted that the determined provision port number is represented as a parameter "supply_port" in the flowchart shown in FIG. 6.

Referring to FIG. 7, a subsequent process of the process (S1) for receiving the print job creation request will be described. In steps S20 to S34, the provision URL 772 (see FIG. 5C) is created based on the protocol stored in the protocol memory area 131 (see FIG. 2) and the provision port number determined in S18.

Firstly, it is judged whether the protocol stored in the protocol memory area 131 (see FIG. 2) is HTTP or HTTPS (S20). When HTTP is stored (S20: HTTP), "http://" is set in the protocol portion 7721 of the provision URL 772 (S22). Meanwhile, when HTTPs is stored (S20: HTTPS), "https://" is set in the protocol portion 7721 of the provision URL 772 (S24).

Subsequently, based on whether there is stored in the version storing area 7611 (see FIG. 5A) included in the print job creation request 76, "4" or "6," the version of the IP used in the communication of the print job creation request 76 is judged (S28).

When the version of the IP used in the communication of the print job creation request 76 is judged to be the version 4, namely, when the IP used in the communication of the print job creation request 76 is IPv4 (S28: version 4), the IP address 141 for IPv4 of the image forming device 10 is selected and set in the IP address portion 7722 of the provision URL 772

(S30). Meanwhile, when the version of the IP used in the communication of the print job creation request 76 is judged to be the version 6, namely, when the IP used in the communication of the print job creation request 76 is IPv6 (S28: version 6), the IP address 142 for IPv6 of the image forming device 10 is selected and set in the IP address portion 7722 of the provision URL 772 (S32).

The case where the IP address 142 for IPv6 is set will be explained in more detail. In the image forming device 10, a plurality of kinds of IP addresses 142 for IPv6 are set, an IP address with the same prefix as that of the IP address stored in the IP address memory area 132 (see FIG. 2) is found from the IP addresses 142 for IPv6, and set in the IP address portion 7722 of the provision URL 772.

Here, the prefix of the IP address is a portion representing an address of a corresponding network. For example, since both the link local address 1421 of the image forming device 10 and the link local address 5421 of the client PC 50 are addresses corresponding to the LAN 60, the both addresses 1421 and 5421 have the same prefix.

Therefore, in the case where the present process is configured in this way such that an IP address with the same prefix as that of the IP address stored in the IP address memory area 132 is found and set in the IP address portion 7722, when the IP address stored in the IP address memory area 132 is the link local address 1421, the link local address 1421 of the image forming device 10 is read out and set in the IP address portion 7722. Consequently, in the transmission of the print data from the client PC 50 to the image forming device 10, the link local address 1421 of the image forming device 10 is used.

Here, in the transmission of the print job creation request 76 from the client PC 50, when the connection to the image forming device 10 is established with the link local address 5421, there is a possibility that the client PC 50 may not be permitted to be connected with the Internet, and may be permitted to perform communication within the LAN 60. Therefore, in the transmission of the print data from the client PC 50 to the image forming device 10, when an address other than the link local address 5421 is used, the communication might be blocked by a firewall. However, in the present embodiment, as described above, the link local address 1421 of the image forming device 10 is used. Thereby, it can be prevented that the communication is blocked by the firewall.

Next, the provision port number determined in S18 is set in the port portion 7723 of the provision URL (S34). Then, the print job creation response 77 including the provision URL 772 created in this manner is created with the protocol stored in the protocol memory area 131 (S36). That is, when the protocol stored in the protocol memory area 131 is HTTP, the print job creation response 77 is created with HTTP. Meanwhile, when the protocol stored in the protocol memory area 131 is HTTPS, the print job creation response 77 is created with HTTPS.

Subsequently, the print execution process (S50) is launched (S38). The print execution process will be described below with reference to FIG. 8.

Then, the created print job creation response 77 is sent to the client PC 50 with the protocol stored in the protocol memory area 131 (see FIG. 2) (S40). Specifically, when the protocol stored in the protocol memory area 131 is HTTP, the print job creation response 77 is transmitted with HTTP. Meanwhile, when the protocol stored in the protocol memory area 131 is HTTPS, the print job creation response 77 is transmitted with HTTPS. Thereafter, the present process goes back to S2, in which the ports No. 80 and No. 443 are monitored again, waiting for the connection to be established by the client PC 30, 40, or 50.

According to the process (S1) for receiving the print job creation request, when the protocol used at the side of the client PC 30, 40, or 50 is HTTP, the communication can be performed with HTTP. Meanwhile, when the protocol used at the side of the client PC 30, 40, or 50 is HTTPS, the communication can be performed with HTTPS. Therefore, an operation burden that the user at the side of the client PC 30, 40, or 50 is to bear can be lightened. Further, even though, at the side of the client PC 30, 40, or 50, the user selects and uses HTTPS for the sake of security protection, or HTTP for the sake of faster processing speed, communication on which the user's intention is reflected can be performed. Additionally, for example, even though the protocol to be used is changed at the side of the client PC 30, 40, or 50, communication that conforms to the change can be performed.

When IPv4 is used in the transmission of the print job creation request 76 from the client PC 30, 40, or 50, the IP address 141 for IPv4 is selected. Meanwhile, when IPv6 is used in the transmission of the print job creation request 76 from the client PC 30, 40, or 50, the IP address 142 for IPv6 is selected. Then, the provision URL 772 including the selected IP address is created. Hence, at the side of the client PC 30, 40, or 50, by sending the print data 78 with the provision URL 772, the print data 87 can be transmitted with the same protocol as that used in the transmission of the print job creation request 76. Thereby, the operation burden that the user at the side of the client PC 30, 40, or 50 is to bear can be reduced.

Referring to FIG. 8, the print execution process (S50) will be explained. FIG. 8 is a flowchart showing the print execution process (S50). The print execution process (S50) shown in FIG. 8 is launched each time the print job creation request 76 is received in the process (S1) for receiving the print job creation request. In addition, when a plurality of print job creation requests 76 are received by the image forming device 10, a plurality of print execution processes (S50) are run. The plurality of print execution processes (S50) and processes (S1) for receiving the print job creation request are artificially performed in parallel.

Firstly, a port with the provision port number notified of as the provision URL 772 is monitored, waiting for the connection to be established by the client PC 30, 40, or 50 (S52). While any connection is not established by the client PC 30, 40, or 50 (S52: No), the present process is in the stand-by state. Meanwhile, when the connection is established by the client PC 30, 40, or 50 (S52: Yes), the print data transmitted by the client PC 30, 40, or 50 that has established the connection is received (S54).

Next, the received print data are analyzed, and it is judged based on the analysis whether the protocol used in the established connection is HTTP or HTTPS (S56). Subsequently, it is judged whether the protocol recognized in S56 is identical to the protocol stored in the protocol memory area 131 (see FIG. 2) (S58). When it is judged that the protocol recognized in S56 is identical to the protocol stored in the protocol memory area 131 (S58: Yes), it is judged whether the IP address of the client PC that has established the connection through the port of the provision port number is identical to the IP address stored in the IP address memory area 132 (S60).

When any of the judgments in S58 and S60 is negative, that is, when the protocol used in the connection for the print data transmission is not identical to that used in the connection for the transmission of the print job creation request (S58: No), or when the IP address used in the connection for the print data transmission is not identical to that used in the connection for the transmission of the print job creation request (S60: No), an error notification is created and sent to the client PC as the sending source of the print data (S61). Thereafter, the present process goes back to S52, waiting for the connection through the port of the provision port number. According to the above procedure, even though the data are received from a device (or program) different from the sending source of the print job creation request, it can be prevented that the process is wrongly advanced. Furthermore, the print data can certainly be received with waiting for the print data 78 to be transmitted from the sending source of the print job creation request 76.

Meanwhile, when the judgments in S58 and S60 are affirmative, that is, when the protocol used in the connection for the print data transmission is identical to that used in the connection for the transmission of the print job creation request (S58: Yes), and when the IP address used in the connection for the print data transmission is identical to that used in the connection for the transmission of the print job creation request (S60: Yes), the received print data 78 is inputted into the image forming unit 15 (see FIG. 2), an image based on the print data 78 is formed with the image forming unit 15 (S62).

Next, it is judged whether the print data 78 is completely received (S64). When it is not judged that the print data 78 is completely received (S64: No), the present process is repeated from S54. When the print data 78 is completely received by repeating the steps S54 to S64 (S64: Yes), the print end notification is created and sent to the client PC as the sending source of the print data (S68). Thereafter, the monitoring of the port of the provision port number is stopped, and the port is set into an unused state (S70). Then, the print execution process (S50) is terminated. Thereby, the port number used for the print execution process (S50) is released and available for other processes.

According to the print execution process (S50), the print data 78 can certainly be received from the sending source of the print job creation request 76. Further, in the print execution process (S50), since the print data 78 are waited for with a port number different from that used in the process (S1) for receiving the print job creation request, the process (S1) for receiving the print job creation request can accept the connection to be established by other client PCs 30, 40, and 50 even while the print data are being received and processed in the print execution process (S50). Therefore, it can be prevented that the server program 121 is occupied by a single client. In particular, even though the protocol to be determined as part of the destination information is HTTP or HTTPS, the print data are waited for with a predetermined port number other than the port number conforming to the protocol (in the present embodiment, a port number obtained by incrementing the port number conforming to the protocol by one). Hence, it is prevented only by changing the port number for waiting for the print data therewith, without changing the protocol, that the server program 121 is occupied by a single client.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the above embodiment has been described based on an assumption that the image forming device 10 forms an image in an inkjet printing method. However, the invention can be applied to a device that forms an image in another method such as a laser printing method and thermal transfer printing method.

Additionally, in the process (S1) for receiving the print job creation request, it is judged by analyzing the received print job creation request 76 whether the protocol is HTTP or HTTPS. Alternatively, the process (S1) may be configured such that the protocol is judged to be HTTP in the case where the received port number is "80," while the protocol is judged to be HTTPS in the case where the received port number is "443."

What is claimed is:

1. An image forming device configured to receive print data from a client via a network and process the print data, comprising:
   a processor comprising:
   a print request receiving unit configured to receive a print request transmitted by the client with a protocol through a port of the image forming device;
   a protocol specifying unit configured to specify a kind of the protocol used in the transmission of the print request;
   a destination information determining unit configured to determine destination information representing a destination to which the print data are to be sent, based on the protocol of the kind specified by the protocol specifying unit;
   a destination information sending unit configured to send the destination information to the client with the protocol of the specified kind;
   a port number specifying unit configured to specify a port number of the port for receiving the print request therethrough; and
   a port number determining unit configured to determine a port number of a port for receiving the print data therethrough based on the port number specified by the port number specifying unit;
   wherein the destination information determining unit includes a port number adding unit configured to incorporate the port number determined by the port number determining unit into the destination information determined by the destination information determining unit;
   wherein the port number determining unit determines a port number different from the port number of the port for receiving the print request therethrough as the port number of the port for receiving the print data therethrough;
   wherein the processor further comprises a print process executing unit configured to execute a print process for waiting for a connection to be established with the port number determined by the port number determining unit so as to receive the print data from the client;
   wherein the processor further comprises a first processing unit and a second processing unit the first processing unit comprising the print request receiving unit the protocol specifying unit, the destination information determining unit, the destination information sending unit, the port number specifying unit and the port number determining unit, and the second processing unit comprising the print process executing unit;

wherein the second processing unit is configured to be launched by the first processing unit in response to the destination information determining unit determining the destination information, the second processing unit being further configured to receive the print data sent to the destination represented by the destination information; and wherein the port number determining unit determines a port number of a port that is not being used, as a port number of a port for receiving the print data from the client.

2. The image forming device according to claim 1, wherein the protocol specifying unit is configured to judge which is used in the transmission of the print request by the client between HTTP and HTTPS.

3. The image forming device according to claim 1, further comprising an identification storing unit configured to store therein identification information for identifying the image forming device on the network for each of a plurality of versions of protocols, wherein the destination information determining unit includes an identification adding unit configured to select identification information for the same protocol as used in the transmission of the print request from information stored in the identification storing unit, and to incorporate the selected identification information into the destination information determined by the destination information determining unit.

4. The image forming device according to claim 1, further comprising:

a client identification storing unit configured to store therein identification information for identifying the client that has sent the print request; an identification comparing unit configured to judge whether identification information of a client that has sent print data is identical to the identification information stored in the client identification storing unit in response to receiving the print data; and a control unit configured to control the image forming device to form an image based on the received print data when the judgment by the identification comparing unit is affirmative.

5. The image forming device according to claim 4, further comprising:

a protocol storing unit configured to store therein the protocol of the kind specified by the protocol specifying unit; and a protocol comparing unit configured to judge whether protocol used in the transmission of the print data is identical to the protocol stored in the protocol storing unit in response to receiving the print data, wherein the control unit controls the image forming device to form the image based on the received print data when both the judgments by the identification comparing unit and the protocol comparing unit are affirmative.

6. A method applicable to an image forming device configured to receive print data from a client via a network and process the print data, comprising steps of:

receiving a print request transmitted by the client with a protocol;

specifying a kind of the protocol used in the transmission of the print request;

determining destination information representing a destination to which the print data are to be sent, based on the protocol of the specified kind; and sending the destination information to the client with the protocol of the specified kind;

wherein the image forming device comprises a first process and a second process, the first process comprising the steps of receiving the print request, specifying the kind of the protocol; determining destination information and sending the destination information the first process further comprising the steps of:

specifying a port number of the port for receiving the print request therethrough;

determining a port number of a port for receiving the print data therethrough based on the specified port number so that the port number of a port for receiving the print data is different from the port number of the port for receiving the print request therethrough and is not being used;

incorporating the determined port number into the determined destination information, and launching the second process in response to determining the destination information;

the second process comprising the steps of:

executing a print process for waiting for a connection to be established with the determined port number so as to receive the print data from the client; and receiving the print data sent to the destination represented by the determined destination information.

7. A non-transitory computer readable medium comprising computer readable instructions stored thereon, which cause a computer configured to receive print data from an external device via a network and process the print data to perform steps of:

receiving a print request transmitted by the external device with a protocol;

specifying a kind of the protocol used in the transmission of the print request;

determining destination information representing a destination to which the print data are to be sent, based on the protocol of the specified kind; and sending the destination information to the external device with the protocol of the specified kind;

wherein the computer is caused to perform the steps of receiving the print request, specifying the kind of protocol, determining destination information, and sending the destination information as a first process, the computer being caused to perform, as the first process, the further steps of:

specifying a port number of the port for receiving the print request therethrough;

determining a port number of a port for receiving the print data therethrough based on the specified port number so that the port number of a port for receiving the print data is different from the port number of the port for receiving the print request therethrough and is not being used;

incorporating the determined port number into the determined destination information, and launching a second process in response to determining the destination information;

the computer being caused to perform, as the second process, the steps of:

executing a print process for waiting for a connection to be established with the determined port number so as to receive the print data from the client; and receiving the print data sent to the destination represented by the determined destination information.

* * * * *